United States Patent [19]

Kamiyama et al.

[11] Patent Number: 4,782,575
[45] Date of Patent: Nov. 8, 1988

[54] METHOD OF FABRICATING A POWER TRANSMISSION BELT AND APPARATUS THEREFOR

[75] Inventors: Yoshihiko Kamiyama, Kobe; Misao Fukuda, Miki; Akihiro Nagata, Komaki, all of Japan

[73] Assignee: Mitsuboshi Belting Ltd., Nagato, Japan

[21] Appl. No.: 27,304

[22] Filed: Mar. 18, 1987

[30] Foreign Application Priority Data

Mar. 25, 1986 [JP] Japan .................................. 61-67824

[51] Int. Cl.$^4$ ............................................. B23P 17/00
[52] U.S. Cl. ...................................... 29/411; 29/33 Q; 29/33 S; 29/417; 156/139; 156/142; 409/138; 409/157
[58] Field of Search .................... 29/33 Q, 33 S, 411, 29/412, 417; 83/925 EB; 156/139, 142, 510; 409/132, 138, 157, 192; 474/265

[56] References Cited

U.S. PATENT DOCUMENTS

| | | | |
|---|---|---|---|
| 1,401,480 | 12/1921 | King | 474/265 X |
| 1,911,185 | 5/1933 | Gates | 156/510 X |
| 3,818,576 | 6/1974 | Braden et al. | 29/558 X |
| 4,430,067 | 2/1984 | Whitaker | 474/265 X |
| 4,554,850 | 11/1985 | Edgar et al. | 83/925 EB X |

Primary Examiner—Timothy V. Eley
Assistant Examiner—Frances Chin
Attorney, Agent, or Firm—Wood, Dalton, Phillips, Mason & Rowe

[57] ABSTRACT

A power transmitting belt manufacture wherein belts are molded to have various cross sections. The belts are machined to a desired cross section. Each belt is entrained about drive and driven pulleys to run the belt under a preselected tension. At least one roller is caused to engage the back surface of the driven belt to reinforce the otherwise unsupported belt at the point of cutting between drive and driven pulleys. A pair of opposed cutting blades are engaged with the opposite sides of the belt to form the opposite side edges of the final belt section. An apparatus is disclosed for fabricating such a power transmitting belt which has a belt feeder for placing the belt over a drive pulley and a driven pulley, a pair of belt machining units each having at least one rotatable cutting blade for cutting the side walls of the belt, X-axis movable bases for controlling the movement of belt machining units towards and away from each other and thereby control belt width, a roller unit, and a Y-axis movable base for carrying the roller unit for pressing a roller of the roller unit against the back surface of the belt.

27 Claims, 3 Drawing Sheets

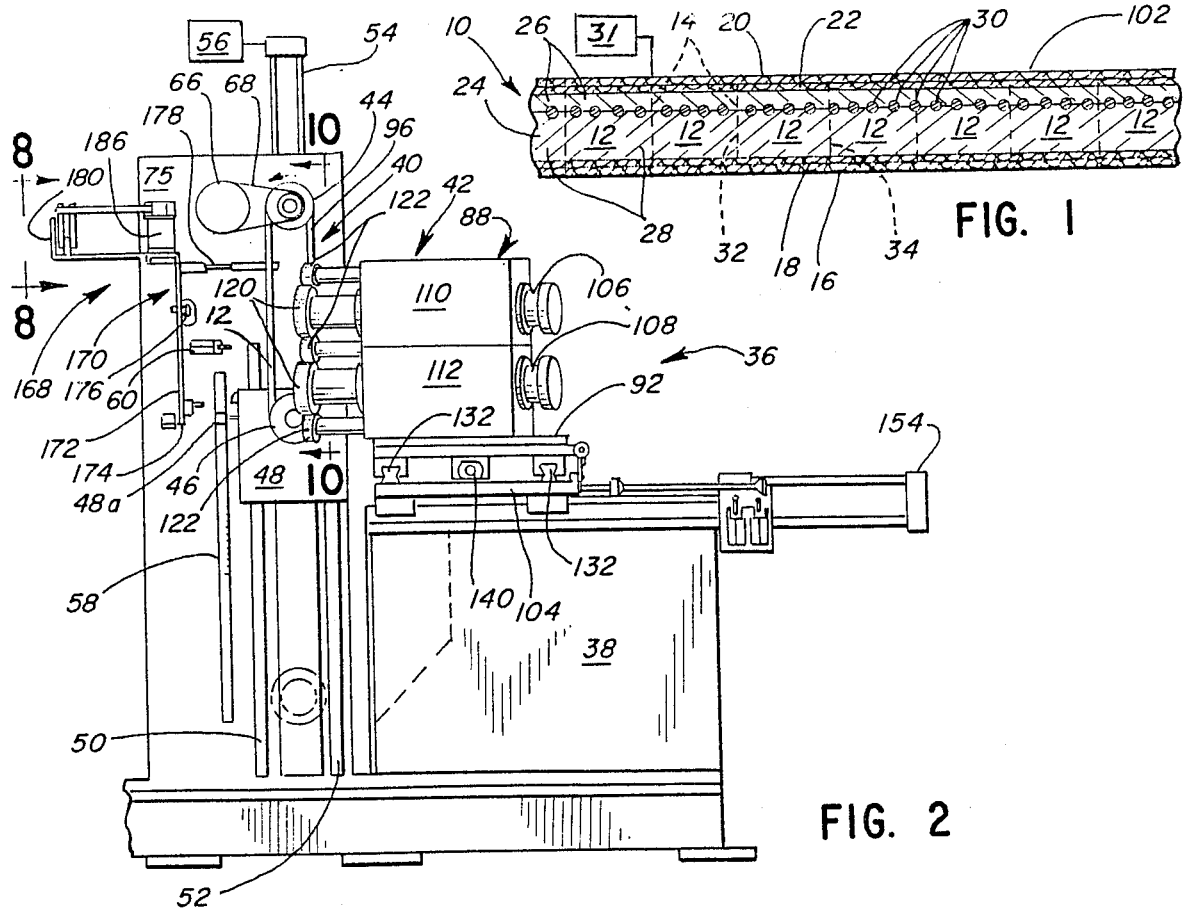
FIG. 1
FIG. 2
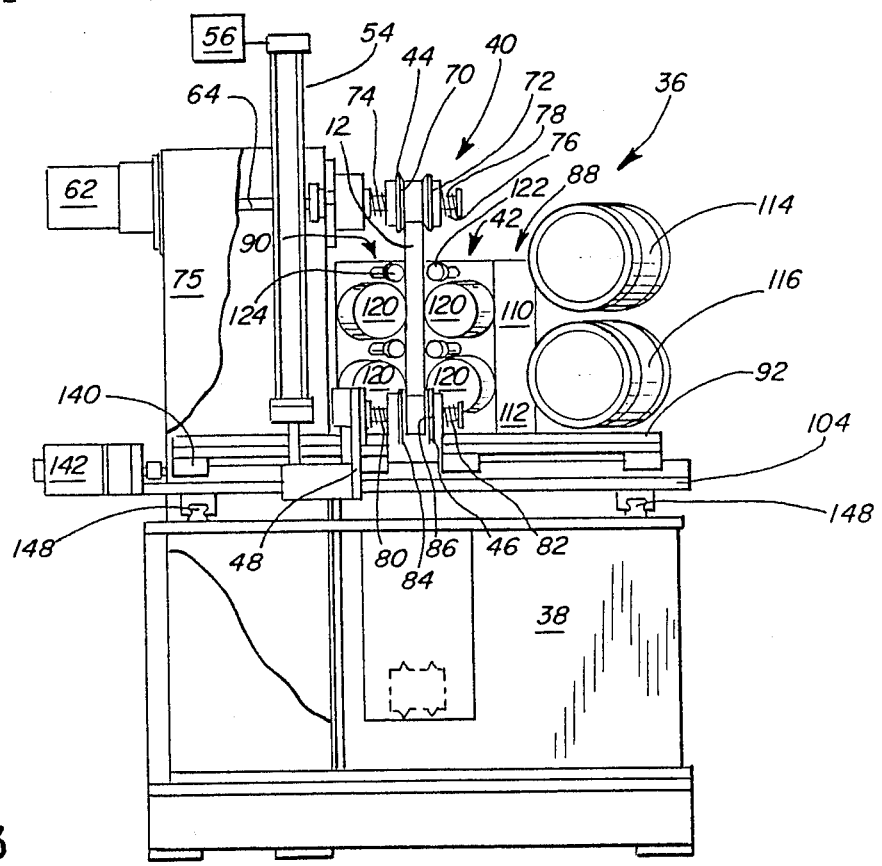
FIG. 3

METHOD OF FABRICATING A POWER TRANSMISSION BELT AND APPARATUS THEREFOR

TECHNICAL FIELD

This invention relates to a method of fabricating a power transmission belt and an apparatus for carrying out the method. Particularly, the invention relates to such a belt manufacture wherein individual vulcanized belt preforms are machined to have any one of a plurality of different cross-sectional shapes. In the illustrated embodiment, the belt is brought to its desired cross section by cutting the side edges.

BACKGROUND ART

It is conventional to form a plurality of power transmitting belts from a vulcanized sleeve. Such sleeves are conventionally formed by wrapping successive layers of the belt components about a mandrel. Upon completion of the vulcanization of the sleeve, the sleeve is cut lengthwise to define a plurality of separate belt preforms.

It is conventional to cut the belt elements to the desired trapezoidal shape so as to define individual V-belts without further machining operations. A problem has arisen, however, in connection with such belt manufacture, in that the V-belts often vary from one to the other in length and cross-sectional shape due to machining errors such as may result, for example, from the thermally shrinking material characteristics of the belt. Further, the tensile elements of the belt are often displaced causing shortened useful life of the belt in power transmission use.

Alternatively, the sleeve may be cut to the desired shape before vulcanization and the individual belts vulcanized in a suitable mold. Such manufacture similarly does not provide completely satisfactory belt structures.

It is common to form the side surfaces of the belt by grinding. Such grinding of the belt material, however, may not only affect the length of the belt but vary the position of the belt relative to the axial center of the pulleys with the belt entrained thereabout.

As a result of the inaccuracies in such manufacture, conventional power transmission belts are often subject to vibration and variation in belt tension during use not only causing shortening of the useful life of the belt but producing undesirable vibrations in the machine being driven.

Because of the variations in the belt dimension, it has been common to measure the respective belts to select those having the proper dimensional characteristics and subjecting those that do not have the desired characteristics to further forming steps such as grinding of the side surfaces of the belt so as to permit the belt to seat more deeply in the pulley and thereby shorten the effective length of the belt.

It is known to effect the separation of the vulcanized sleeve into individual V-belts by the use of a rotating grinder rather than cutting tools. Further, the V-shaped portion of the belt may be formed by an abrasive plate while rotating the sleeve on a mandrel with the individual V-belts then being separated from each other by a suitable cutter.

The use of grinding or abrasive means in forming the V-shaped belt has the disadvantage of causing the surface temperature of the rubber to be relatively high such as 100° C. or higher as a result of the frictional heat developed in the grinding operation. Such high temperature causes the molecular bonds of the surface rubber to be broken and thereby causes the surface rubber to be devulcanized. The pressure and frictional forces required in such grinding operations may distort the rubber so that the grinding operations may not result in an accurately preselected V-shaped configuration of the belt.

A further problem arises in such grinding of the belt in that variations in the hardness of the rubber require different abrasive characteristics and thus the grinding means is not always accurately coordinated with the requirements of the material being ground, resulting in defective belt manufacture.

The forming of the V-belts by such grinding manufacture has the further disadvantage of necessitating the use of a substantial number of manufacturing steps and handling operations increasing the costs and manufacturing time.

DISCLOSURE OF THE INVENTION

The present invention comprehends an improved method and apparatus of power transmission belt manufacture which overcomes the disadvantages of the prior art manufactures and which provides improved accuracy in the desired length and cross-sectional shape of the V-belts.

The present invention produces a high ratio of acceptable belts at minimum cost and permits improved speed and facility of manufacture. Spot checking of belts for accuracy of cross-sectional configuration is sufficient as opposed to the requirement of checking each belt in the conventional manufacturing process.

The invention comprehends such belt manufacture wherein a preformed sleeve is separated into a plurality of individual belt preforms having illustratively a square or rectangular cross section. The preforms are individually subjected to a belt forming operation wherein the side wall surfaces of the individual belts are cut by rotating cutting blades while the belt is entrained about a pair of pulleys so as to be driven under tension.

Guide rolls are associated with the cutting tools to maintain accurate lateral disposition of the preform as it is being cut.

A suitable roller is engaged with the back surface of the belt to provide and maintain stability in the feeding of the belt about the pulleys during the cutting operation.

The individual belt preforms may be entrained about the pulleys either manually or by automatic belt feeding means. The pulleys are automatically selectively positioned to receive the preforms and then to effect power transmitting of the belt during the cutting operation.

The cutting means comprises in the illustrated embodiment a pair of belt machining units each having at least one rotatable cutting blade for cutting the side wall of the belt. An X-axis movable base is provided for carrying the belt machining units so as to align the cutting blades as desired with the belt side edges by movement transversely to the exposed outer surface of the entrained belt.

A Y-axis movable base is provided for supporting the roller engaging the back surface of the belt by movement in a direction perpendicular to the X-axis movable base.

The driven pulley is adjustably positionable so as to provide a desired tension in the driven belt. The cutting tools are caused to engage the tensioned portion of the belt running from the driven pulley to the drive pulley.

The cutting tools are engaged with the side edges of the belt preform after the belt is accurately centered by the guide rolls to assure accurate forming of the side surfaces of the belt.

The back surface rollers are aligned with the cutting tool units so as to accurately position and reinforce the unsupported portion of the belt being cut between the drive and driven rollers during the cutting operation.

Upon completion of the forming of the V-belt by the cutting units, the cutting units are moved away from the side surfaces of the belt on the Y- and X-axis movable bases while at the same time the roller is disengaged from the back surface of the belt. Tension on the belt is relieved by moving the driven pulley toward the drive pulley and the belt is then removed from entrained relationship with the pulleys. Such removal may be effected automatically or manually, as desired.

Thus the improved power transmission belt manufacture of the present invention is extremely simple and economical while yet providing a highly improved accurate belt manufacture as discussed above.

BRIEF DESCRIPTION OF THE DRAWINGS

FIG. 1 is a fragmentary, transverse section of a belt sleeve illustrating in broken lines the separation thereof into a plurality of individual belt preforms for further processing in the manufacture of desired V-belts;

FIG. 2 is a front elevation of an apparatus for fabricating a power transmission V-belt embodying the invention;

FIG. 3 is a side elevation thereof with portions removed to facilitate illustration of the structure thereof;

DESCRIPTION OF THE PREFERRED EMBODIMENT

Figure 4:
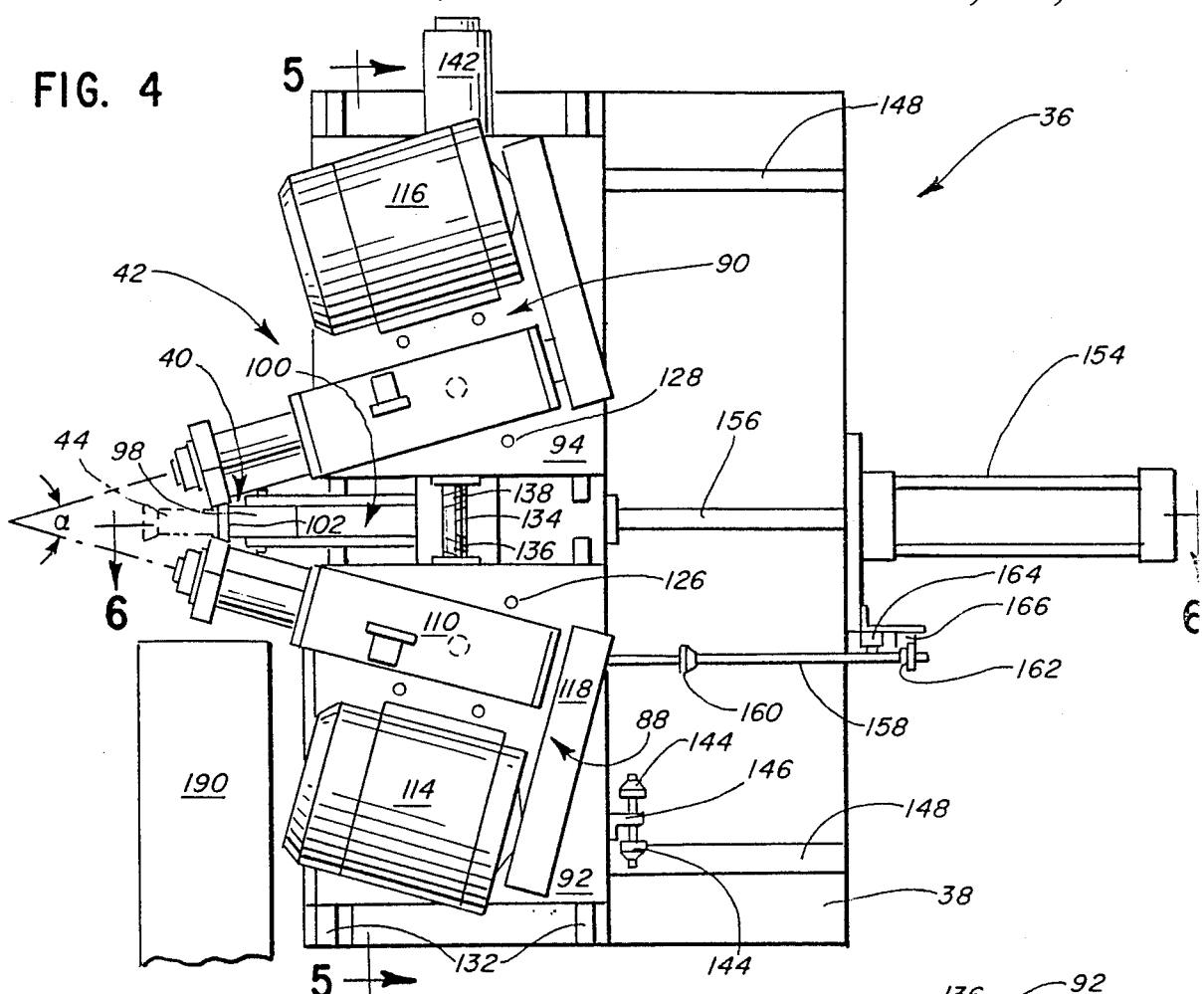
FIG. 4 is a fragmentary, top plan view of the apparatus.
Figure 5:
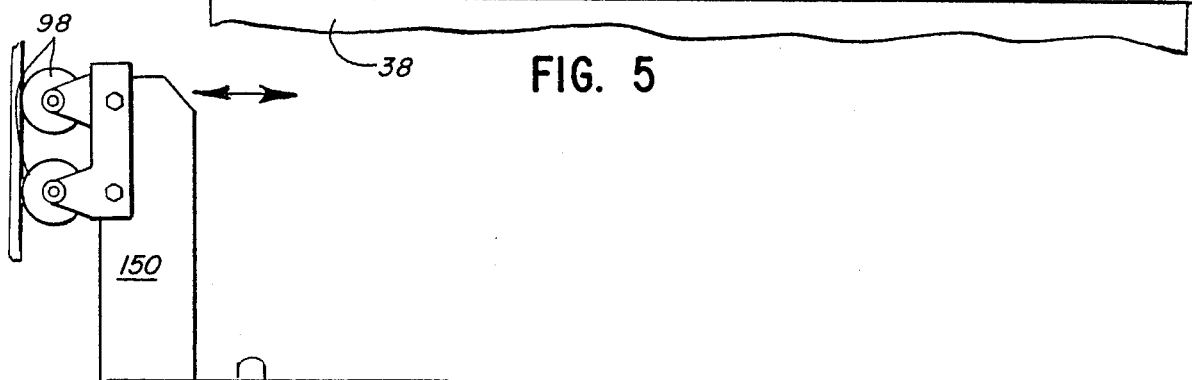
FIG. 5 is a fragmentary, sectional view taken substantially along the line 5—5 of FIG. 4 with belt machining units in FIG. 4 removed.

FIG. 1 depicts in cross section a portion of a conventionally formed, layered belt sleeve at 10 from which individual belts can be formed according to the invention. The arrangement of layers exemplifies one known belt construction, however this particular arrangement is not requisite to the performance of the inventive method of forming belts.

The division of the sleeve 10 into a plurality of square or rectangular belt preforms 12 is indicated by dotted lines 14 in FIG. 1. Each belt preform 12 has an inner, exposed, bias canvas layer 16 and an overlying bias canvas layer 18. The canvas layers 16, 18 are stretchable and have generally the same 90°-155° relationship of crossing warp and weft yarns. The outer portion of each belt preform 12 has an exposed canvas layer 20 and an underlying canvas layer 22, which layers 20, 22 are similar to the aforementioned canvas layers 16, 18.

The midportion 24 of each preform 12 is made from rubber and has an outer tension section 26 and an inner compression section 28 that is thicker than the tension section 26. High strength tensile cords 30 reside between the sections 28, 30 and are preferably defined by spirally wound polyester fibers with a high resistance to elongation. Short fibers made from, for example, cotton or nylon, may be arranged randomly in generally transverse orientation to the belt length in the compression section 28 of the belt.

The sleeve in FIG. 1 is vulcanized by conventional pressure heating means and procedures. After vulcanization a cutter, shown schematically at 31, severs the sleeve 10 along the lines 14 to separate the individual preforms 12. The configuration of the preforms is not limited to the illustrated rectangular configuration or the aforementioned square configuration and may, for example, have a parallelogram-shape in cross section. The belt preforms 12 are in any event rough cut and the present invention is directed to the precise machining of the laterally oppositely facing side edges 32, 34 of each belt preform 12 to a desired configuration. Machining of the belt side edges 32, 34 is carried out through the inventive apparatus shown generally at 36 in each of FIGS. 2-4.

The machining apparatus 36 comprises generally a frame 38 with a belt mounting station at 40 and a two-axis grinder mechanism at 42. At the belt mounting station 40, two vertically spaced pulleys 44, 46 are mounted to the frame 38 for rotation about parallel axes. The upper pulley 44 is a drive pulley and is in vertically fixed relationship to the frame 38. The lower pulley 46 is a driven pulley and is carried on a slider 48 which is guided in a vertical path selectively towards and away from the drive pulley 44 by spaced, upright rails 50, 52 on the frame 38. Controlled vertical positioning of the slider 48 is accomplished through a cylinder 54 which is operated through a conventional type control 56. A graduated scale 58 is fixed on the frame 38 and gives a visual indication of the position of the slider 48 relative to the frame 38 and thereby gives an indication of the spacing between the centers of pulleys 44, 46 and the precise length of a belt 12 entrained thereon. The upper limit of the range of movement of the slider 48 is determined by a limit switch 60, which contacts an arm 48a, which follows vertical movement of the slider 48. At the upper limit of travel for the slider 48, the arm 48a engages the switch 60 and arrests operation of the cylinder 54. The spacing of the pulleys 44, 46 can be ascertained from the position of the arm 48a along the scale 58. A predetermined tension on a belt 12 entrained on the pulleys 44, 46 is thus established by selecting a predetermined vertical position of the slider 48 automatically through control 56.

The pulley 44 is driven by a motor 62 which has a drive shaft 64 carrying a pulley 66. A drive belt 68 transmits motion from the pulley 66 to the pulley 44. The drive pulley 44 has axially spaced sheave portions 70, 72. A coil spring 74 biases sheave portion 70 axially outwardly from an upright section 75 on the frame 38 and coil spring 76 biases sheave portion 72 axially oppositely so that the pulley 44 is maintained in a predetermined position on its mounting shaft 78 by the opposing spring forces and the sheave portions 70, 72 are biased against the side edges 32, 34 of the belt preform 12. Coil springs 80, 82 serve the same function as springs 74, 76 and act on corresponding sheave portions 84, 86 on the driven pulley 46. It should be understood that the described pulley construction is not limiting and one alternative thereto is to utilize flat pulleys with fixed flanges.

The grinder mechanism 42 consists of spaced machining units 88, 90 which separately and concurrently act on opposite edges 32, 34 of the belt preforms 12. The units 88, 90 are carried on separate bases 92, 94 respectively, which bases 92, 94 are mounted for X- and Y-axis movement relative to the frame 38, as hereinafter described, and along the X-axis for movement substantially at right angles to the vertical, tensioned portion 96 of a belt 12 entrained on the pulleys 44, 46.

Movement of the units 88, 90 towards the left in FIGS. 2 and 4 brings rollers 98 (FIG. 6) on a push roll assembly 100 between the units 88, 90 against the outer surface 102 of a belt 12 on the pulleys 44, 46 to reinforce the tensioned portion 96 of the belt that is otherwise unsupported between pulleys 44, 46 and so that the tensioned portion 96 of the belt 12 is consistently positioned in relationship to the grinder mechanism 42. Base 104 carries the grinder mechanism 42 and translates the mechanism 42 as a unit along the X-axis relative to the frame 38.

Figure 10:
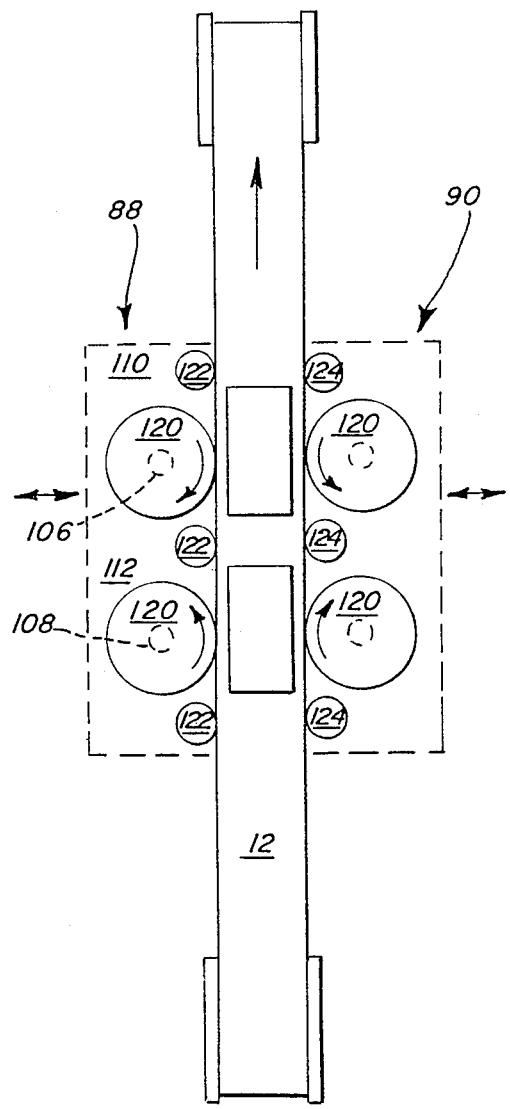
FIG. 10 is a schematic view illustrating the cooperating belt guiding and cutting structure for providing the improved belt manufacture.

The mechanical details of the grinding mechanism 42 are shown in FIGS. 2–4 and 7 and the mechanism 42 is shown schematically in FIG. 10. The construction of each of the units 88, 90 is substantially the same with slightly different orientation of parts and thus detailed discussion will be limited herein to one exemplary unit 88. The unit 88 has vertically spaced shafts 106, 108 journalled for rotation about parallel axes within housings 110, 112 respectively carried on the base 92. The axes of the shafts 106, 108 are parallel to each other and the intended plane of the finished side edge 34 of the belt 12. The shafts 106, 108 are driven respectively by motors 114, 116 through associated belts 118 (one shown in FIG. 4).

Figure 7:
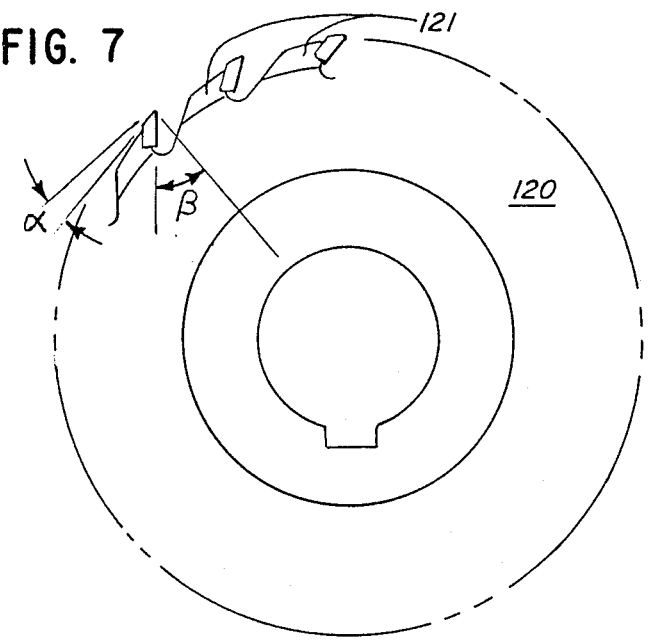
FIG. 7 is a fragmentary, side elevation of a cutting blade adapted for use in the belt manufacture embodying the invention.

The shafts 106, 108 each carry at their free end a cutting blade 120, which is shown in detail in FIG. 7. The cutting blades 120 preferably have anywhere from 10 to 100 teeth 121, with ±40° of twisting angle rake angle ($\beta$) from 0°–60° and relief angle ($\alpha$) of from 0°–30°. The width of the blade 120 is greater than the width of the belts edges 32, 34 so that complete cutting of the belt edges 32, 34 occurs. As an alternative to the use of a blade such as that shown in FIG. 7, an abrasive can be used.

As most clearly seen in FIGS. 3 and 10, the blades 120 on shafts 106 and 108 are in vertical alignment. The blade 120 on shaft 106 rotates in a counterclockwise direction in FIG. 10 and the blade 120 on shaft 108 rotates oppositely thereto, i.e. counterclockwise. Counterclockwise rotation of drive pulley 44 in FIG. 2 causes the tensioned portion 96 of the belt 12 to travel upwardly. As the belt 12 is being driven, the cutter 120 on shaft 108, which cutter 120 rotates in the same direction as belt travel, first machines the belt edge 34 to the desired angle, as determined by the orientation of the unit 88 and the associated axes of shafts 106, 108. The oppositely rotating blade 120 on shaft 106 then removes any remaining burrs to produce a finished, smooth surface on the edge 34.

To assure consistent vertical travel of the belt portion 96 between cutter blades 120 and spaced machining units 88, 90, a plurality of guide rollers 122 are provided on machining unit 88 and a corresponding plurality of guide rollers 124 are provided on unit 90. The peripheral surfaces of rollers 122, 124 define a vertical belt path and closely guide the oppositely facing edges 32, 34 of the belt 12. The guide rollers 122, 124, while shown fixedly attached to the machining units 88, 90, may alternatively be carried directly by the bases 92, 94, respectively. With the rollers mounted 122, 124 on the bases 92, 94, the rollers 122, 124 might be oriented in perpendicular relationship to their position shown in the figures and accomplish the same end.

It is not necessary to have intimate contact between the guide rollers 122, 124 and belt sides 32, 34 during a cutting operation. It is sufficient if an interval is maintained between the guide rollers 122, 124 and belt sides 32, 34, on the order of two millimeters or less. This allows clearance to accommodate or regularities in the belt cross section and at the same time the rollers 122, 124 smoothly and consistently guide travel of the belt.

Consistent positioning of the units 88, 90 relative to the frame 38 and thus the belt 12 entrained on the pulleys 44, 46, is insured by the provision of aligning stops 126, 128 associated with bases 92, 94. Consistent positioning of the units 88, 90 relative to the belt 12 is further assured by the push roll assembly 100, which bears on the outer surface 102 side of the belt 12. In the absence of the push roll assembly 100, there is a tendency of the units 88, 90 which, in operation, simultaneously act on the opposite sides 32, 34 of the belt 12, to urge the belt 12 toward the right in FIG. 4 because of the relative angular orientation of the belt sides 32, 34.

The bases 92, 94 are mounted for guided translatory movement along rails 132 simultaneously towards and away from the side edges 32, 34 of belt 12 entrained on the pulleys 44, 46. The bases 92, 94 are interconnected by a central shaft 134 having oppositely threaded lengths 136, 138 associated with the bases 92, 94 respectively. The shaft 134 is connected to the bases 92, 94 through ball joints 140 and operated by a pulse motor 142 connected at one end of the shaft 134. Limit switches 144 are provided on the frame 38 and cooperate with an arm 146 on the base 92 to limit the range of travel of the bases 92, 94.

Figure 6:
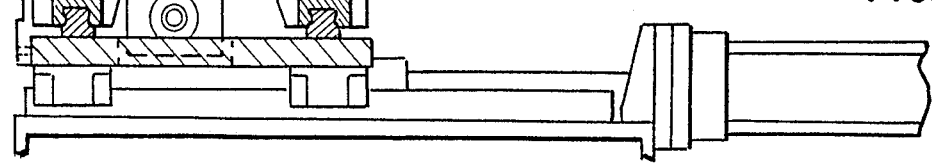
FIG. 6 is a transverse sectional view taken substantially along the line 6—6 of FIG. 4 with the belt machining units removed.

The aforementioned push roll assembly 100 is carried on the base 104, as shown in FIGS. 3, 4 and 6. and follows movement in the X-axis of base 104. As seen clearly in FIGS. 3 and 4, the base 104 is guided along spaced, parallel rails 148 to selectively move the units 88, 90 back and forth along the X-axis. The rollers 98 on the assembly 100 are mounted on an upright column 150 for rotation about axes parallel to the outer surface 102 of the belt 12. The rollers 98 resist the tendency of the cutter blades 120 to distort the vertically extending portion 96 of the belt 12.

Positioning of the base 104 and thereby the rollers 98 along the X-axis is controlled by a cylinder 154 having an associated arm 156 which connects to the base 104. The base 104 has an associated rod 158 carrying two spaced stops 160, 162, which cooperate with fixed stop elements 164, 166, respectively, on the frame 38 to limit the range of movement of the base 104 along the X-axis. The stop 162 is adjustable justable along the length of the rod 158 to a predetermined position so that the position of machining units 88, 90 during a cutting operation and the amount of pressure applied to the surface 102 of the belt 12 through the rollers 98 can be consistently preset.

Figure 8:
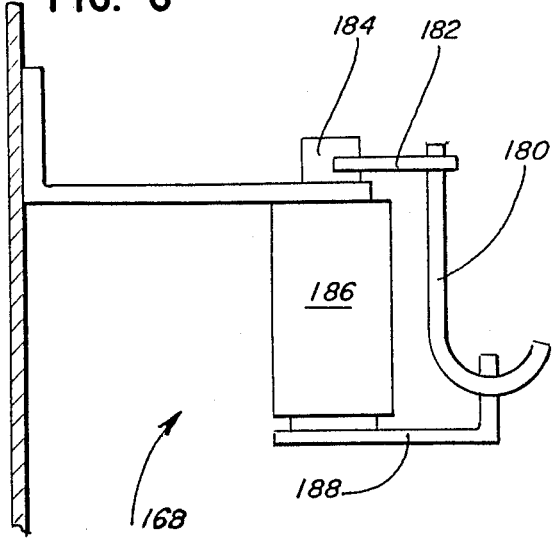
FIG. 8 is a fragmentary, side elevation of part of an automatic belt transfer structure along the line 8—8 of FIG. 2.

In FIGS. 2 and 8, structure for transferring a belt 12 from the drive pulleys 44, 46 is shown at 168. Structure for removing the belt from the pulleys 44, 46 is shown generally at 170 and consists of an elongate arm 172 pivotally mounted to the frame 38 at its lower extremity 174, with pivotal movement being imparted to the arm 172 through a cylinder 176, coupled to the arm 172 at an intermediate height thereon. A belt pusher arm 178, remote from the arm extremity 174, engages the belt 12 between the pulleys 44, 46 and, upon the cylinder 176 being operated, draws the belt off of the pulleys 44, 46. prior to this occurring, the slider 48 is automatically elevated through the control 56 to release tension on the belt 12.

The pusher arm 178 delivers the belt 12 to an upwardly opening hook-shaped hanger 180. The hanger 180 depends from an arm 182, which is coupled to a shaft 184 on a cylinder 186 for rotating the arm 182. The cylinder 186 has an associated, fixed arm 188, which abuts the hanger 180 and thereby limits the rotation of shaft 184 with hanger 180 in one direction of rotation. Rotation of shaft 184 is synchronized with the movement of arm 178 so that the belt 12 drawn off of the pulleys 44, 46 is smoothly exchanged between the arm 178 and hook 180. The shaft 184 with a belt 12 is then rotated approximately 180° from its position at the point of exchange through cylinder 186 into abutting relationship with the fixed arm 188 at which point the belt 12 separates from the hanger 180.

Figure 9:
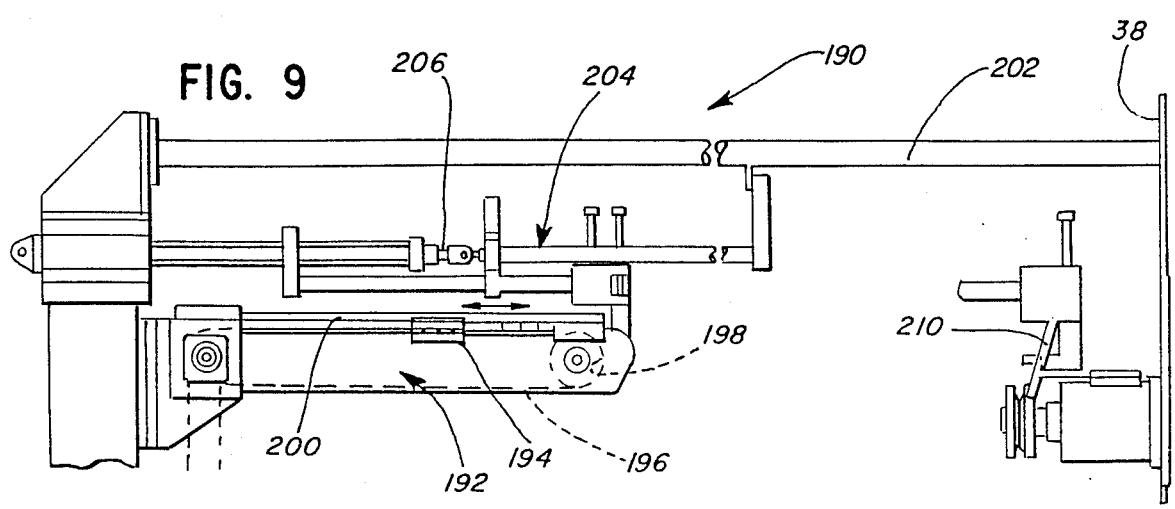
FIG. 9 is a fragmentary, side elevation illustrating an automatic belt mounting unit associated with the apparatus.

Automatic mounting of each preform belt 12 can be accomplished through structure shown at 190 in FIGS. 4 and 9. The details of the belt mounting structure 190 are shown in U.S. Pat. No. 4,505,073, which is assigned to the assignee of the present invention, and a detailed description herein of the belt mounting structure 190 is therefore unnecessary.

The belt mounting structure 190 performs the function of storing a plurality of belt preforms 12 and sequentially delivering individual preform belts 12 for entrainment on the pulleys 44, 46. In FIG. 9 a cylindrical belt holder 192 is shown for storing a plurality of the preform belts 12. A belt pushing plate 194 is carried on an endless chain 196 driven by a gear 198 in a clockwise manner in FIG. 9. The belts 12 thus feed from left to right in FIG. 9. A belt retaining plate 200 maintains the belts evenly distributed on the cylindrical belt holder 192.

A tie rod 202 connects between the belt mounting structure 190 and frame 38. A reciprocating belt carrier 204 moves back and forth between the belt holder 192 and the frame 38. The belt carrier 204 has an associated cylinder 206 which effects the requisite reciprocating movement.

The belt carrier 204 receives a single belt from the holder 192 and carries the same toward the drive pulley 44. The carrier 204 deposits the belt against an inclined guide member 210 immediately above the pulley 44 and upon separation of the belt 12 from the carrier 204, the belt 12 slides along the member 210 into seated relationship with the pulley 44 at which point the carrier 204 can be retracted through the cylinder 206.

In operation, a single belt is either manually entrained on the pulleys 44, 46 or is automatically mounted as through the belt mounting structure 190. In the latter operation, the driven pulley 46 is elevated through slider 48 before the belt 12 is mounted. Once the belt 12 is aligned with the pulleys 44, 46, the control 56 is operated to lower the slider 48 and thereby automatically tension the belt a predetermined amount.

Once the belt is mounted, the base 104 is translated to bring the push roll assembly 100 and the rollers 98 thereon against the belt 12. Initially the belt machining units 88, 90 are moved sufficiently away from each other that the cutter blades 120 will clear the mounted belt 12. Once the belt 12 is located between the cutting blades 120 in a precise, predetermined relationship as assured by stop 162, the pulse motor 142 can be operated to rotate the shaft 134 and thereby draw the units 88, 90 towards each other and cause the cutting blades 120 to grind down the belt edges 32, 34 at a desired angle. A typical angle for the sides 32, 34, which are symmetrical about the X-axis, is from 20°–40°.

The rate of movement of the units 88, 90 towards each other and thus the speed of cutting depends largely on the hardness of the belt material. For example, with NB, SBR, CR or rubber produced by mixing rubber with short fiber and urethane elastomer with hardness (JIS-A) of 75–90, a typical feed rate is from 5 millimeters per minute to 100 millimeters per minute. If this feed rate is increased, the loop of the belt 12 may deform, thereby making accurate cutting of the belt sides 32, 34 impossible.

As previously mentioned, the lower blades 120 of the units 88, 90, are the primary cutting blades and rotate in the same direction as belt travel to smoothly finish the side edges 32, 34 of the belt 12. The relationship between the travel speed of the belt 12 and the circumferential velocity of the cutting teeth 121 are controlled to maximize the smoothness of the belt edges 32, 34. Preferably, the ratio of the circumferential speed of the tips of the blade teeth 121 to the speed of the belt is from 5–1000. If this ratio is less than 5, the side edges 32, 34 tend to be coarsely cut. When the ratio exceeds 1000, the belt 12 tends to heat to the point that deterioration occurs so that belt life is reduced.

It should be understood that the inventive method and apparatus previously described are not limited to the V-shaped belt trapezoidal cross section described herein. For example, belts having various other shapes, as for example a hexagonal shape, is can be formed according to the invention. Further, the angle a in FIG. 4 between the axes of rotation for the cutter blades 120 can be altered.

Comparative testing has demonstrated that belts made according to the present invention have a smaller variation in distance between the centers of V-shaped pulleys than belts formed by conventional techniques. In performing the tests, two V-shaped belts were compared according to Japanese standard JASO-F902-74 with a predetermined load applied thereto and with the belts moved around twice to three times to apply tension and obtain a variation in axial distance between pulley centers. The variation values for an HB type V-shaped belt made according to the present invention, in the case of n=50 were 0.025 (X), 0.01 ($\sqrt{V}$). The variation values for an HM type V-shaped belt made by conventional methods were in the case of n=500, 0.330 (X) and 0.07 ($\sqrt{V}$). The A values in an A type V-shaped belt made according to the present invention were, in the case of n=50, 0.050 (X) and 0.03 ($\sqrt{V}$), while the values for an A type V-shaped belt made by conventional methods were, in the case of n=500, 0.0350 (X) and 0.09 ($\sqrt{V}$).

To this point description has been limited to the cutting of a single belt entrained on the pulleys 44, 46 by blades 120. However, a plurality of drive and driven pulleys with a corresponding number of belts can be utilized to cut a plurality of belts simultaneously by a corresponding number of cutting blades.

It has been found that cutting of the belt edges 32, 34 according to the invention results in a precisely configured belt. The cross-sectional configuration of the resulting belt is true and uniform throughout. By cutting a belt that is entrained on pulleys maintained under a predetermined load through precise automatic control of the pulley spacing, consistent center-to-center distance can be assured. Because the belt side cutting structure is accurately and consistently positioned with respect to a belt from belt to belt, only random sampling is required and the need to individually check all belts as normally required in conventional manufacturing operations is obviated. Further, delivery of belts for cutting and transfer of the same can be automatically accomplished to make the overall manufacturing process more efficient.

We claim:

1. A method of forming power transmission V-belts comprising the steps of:
   providing a belt sleeve;
   dividing said belt sleeve into a plurality of belt preforms defining opposite side portions and a back surface;
   situating individual belt preforms around a pair of spaced pulleys;
   driving the belt preforms on the spaced pulleys; and
   seriatum forming V-belts from said preforms by simultaneously cutting said side portions of the individual belt preforms as the belt preforms are being driven about the pulleys to define opposite converging side surfaces of the V-belt.

2. The method of forming power transmission V-belts of claim 1 further including the step of pressing a roller against the back surface of the belt between the pulleys adjacent a portion of the belt being cut to stabilize the position of the belt portion as it is being cut.

3. The method of forming power transmission V-belts of claim 1 wherein the side portions are cut to define cut side surfaces and further including the step of smoothing the cut side surfaces after the side portions are cut.

4. The method of forming power transmission V-belts of claim 1 wherein said step of cutting said side portions comprises a step of rotating a pair of cutter blades about spaced axes residing in a single plane to cause the opposite side portions of the driven belt preform to be progressively simultaneously cut by said cutter blades.

5. The method of forming power transmission V-belts of claim 1 including the step of smoothing the cut side surfaces wherein said step of smoothing the cut side surfaces comprises a step of rotating a second pair of cutter blades about an axis to cause the opposite side portions of the driven belt preform to be engaged by the second pair of cutter blades simultaneously with the first claimed cutter blades and progressively simultaneously smoothed by said second pair of cutter blades.

6. The method of forming power transmission V-belts of claim 1 wherein said step of cutting said side portions comprises a step of rotating a pair of cutter blades about an axis to cause opposite side portions of the driven belt perform to be progressively simultaneously cut by said cutter blades moving in the direction of travel of a portion of said belt preform being cut.

7. The method of forming power transmission V-belts of claim 1 including the step of smoothing the cut side surfaces wherein said step of smoothing the cut side surfaces comprises a step of rotating a pair of cutter blades about an axis to cause opposite side portions of the driven belt preform to be progressively simultaneously smoothed by said cutter blades moving oppositely to the direction of travel of the portion of said belt preform being smoothed.

8. The method of forming power transmission V-belts of claim 1 wherein said steps of cutting said side portions comprises a step of rotating a pair of cutter blades about an axis to cause opposite side portions of the driven belt preform to be progressively simultaneously cut by said cutter blades, each of said cutter blades being fed into the belt preform side portions at a similar preselected rate.

9. The method of forming power transmission V-belts of claim 1 including the steps of smoothing the cut side surface wherein said step of smoothing the cut side surfaces comprises a step of rotating a pair of cutter blades about an axis to cause opposite side of portions of the driven belt preform between the spaced pulleys to be progressively simultaneously smoothed by said cutter blades, each of said cutter blades being fed into the belt preform side portions at a similar preselected rate.

10. The method of forming power transmission V-belts of claim 1 wherein said pair of pulleys includes a drive pulley and a driven pulley, and said step of cutting said side portion of the preform comprises a step of cutting the portion of the belt travelling under tension from the driven pulley to the drive pulley.

11. The method of forming power transmission V-belts of claim 1 further including preventing transverse displacement of the belt preform portion being cut.

12. The method of forming power transmission V-belts of claim 1 further including locating a pair of opposed guide elements at opposite sides of the belt preform for preventing transverse displacement of the belt preform portion being cut.

13. Apparatus for forming power transmission V-belts, comprising:
   means for dividing a belt sleeve into a plurality of belt performs each having opposite side portions and a back surface;
   a pair of spaced pulleys around which individual belt preforms can be placed;
   means for driving said belt preform about said spaced pulleys; and
   means for seriatim forming V-belts from said preforms by simultaneously cutting said side portions of the individual preforms as the preform is being driven about the spaced pulleys to define opposite converging side surfaces of the V-belt.

14. The apparatus for forming power transmission V-belts of claim 13 further including a roller and means for pressing the roller against said surface of the belt adjacent said cutting means to stabilize position of the belt portion as it is being cut.

15. The apparatus for forming power transmission V-belts of claim 13 including means for smoothing the cut side surfaces.

16. The apparatus for forming power transmission V-belts of claim 13 wherein said cutting means comprises a pair of cutter blades and means for rotating the pair of cutter blades about an axis to cause the opposite side portions of the driven belt preform to be progressively simultaneously cut by said cutter blades.

17. The apparatus for forming power transmission V-belts of claim 13 including means for smoothing the cut side surfaces wherein said smoothing means comprises a pair of cutter blades and means for rotating the cutter blades about an axis to cause the opposite side portions of the driven belt preform to be progressively simultaneously smoothed by said cutter blades.

18. The apparatus for forming power transmission V-belts of claim 13 wherein said cutting means comprises a pair of cutter blades and means for rotating the pair of cutter blades about an axis to cause the opposite side portions of the driven belt preform to be progressively simultaneously cut by said cutter blades moving in the direction of travel of the portion of said belt preform being cut.

19. The apparatus for forming power transmission V-belts of claim 13 including means for smoothing the cut side surfaces wherein said smoothing means comprises a pair of cutter blades and means for rotating the cutter blades about an axis to cause the opposite side portions of the driven belt preform to be progressively simultaneously smoothed by said cutter blades moving oppositely to the direction of travel of a portion of said belt perform being smoothed.

20. The apparatus for forming power transmission V-belts of claim 13 wherein said cutting means comprises a pair of cutter blades and means for rotating the pair of cutter blades about an axis to cause the opposite side portions of the driven belt preform to be progressively simultaneously cut by said cutter blades, and means for causing each of said cutter blades to be fed into the belt preform side portions at a similar preselected rate.

21. The apparatus for forming power transmission V-belts of claim 13 including means for smoothing the cut side surfaces wherein said smoothing means comprises a pair of cutter blades and means for rotating the cutter blades about an axis to cause the opposite side portion of the driven belt preform to be progressively simultaneously smoothed by said cutter blades, and means for causing each of said cutter blades to be fed into the belt preform side portions at a similar preselected rate.

22. The apparatus for forming power transmission V-belts of claim 13 wherein each of said pair of pulleys includes a driven pulley and a drive pulley, and said means for cutting said side portion of the preform comprises means for cutting the portion of the belt travelling under tension from the driven pulley to the drive pulley.

23. The apparatus for forming power transmission V-belts of claim 13 including means for preventing transverse displacement of the belt preform portion being cut.

24. The apparatus for forming power transmission V-belts of claim 13 including means for preventing transverse displacement of the belt preform portion being cut and a pair of opposed guide elements at opposite sides of the belt preform for preventing transverse displacement of the belt preform portion being cut.

25. The apparatus for forming cut power transmission V-belts of claim 13, and means for preventing transverse displacement of the belt preform portion being cut and a pair of opposed guide elements at opposite sides of the belt preform for preventing transverse displacement of the belt preform portion being cut.

26. The apparatus for forming power transmission V-belts of claim 13, and means for automatically entraining the preform about the pulleys.

27. The apparatus of forming power transmission V-belts of claim 13, and means for automatically removing the cut V-belts from about the pulleys.

* * * * *